(12) United States Patent
Wallis

(10) Patent No.: US 8,512,002 B2
(45) Date of Patent: Aug. 20, 2013

(54) METHOD OF MANUFACTURING AN AEROFOIL

(75) Inventor: Michael J. Wallis, Clitheroe (GB)

(73) Assignee: Rolls-Royce, PLC, London (GB)

(*) Notice: Subject to any disclaimer, the term of this patent is extended or adjusted under 35 U.S.C. 154(b) by 727 days.

(21) Appl. No.: 12/702,838

(22) Filed: Feb. 9, 2010

(65) Prior Publication Data

US 2010/0226778 A1 Sep. 9, 2010

(30) Foreign Application Priority Data

Mar. 4, 2009 (GB) .................................. 0903613.8

(51) Int. Cl.
F04D 29/38 (2006.01)
F04D 29/66 (2006.01)
F01D 5/16 (2006.01)

(52) U.S. Cl.
USPC .... 416/223 R; 416/224; 416/232; 416/241 B; 416/243; 416/223 A

(58) Field of Classification Search
USPC .................. 416/223 R, 224, 232, 233, 241 R, 416/241 B, 243, 223 A; 29/889.1, 889.7, 29/889.71, 889.72, 889.721, 889.722
See application file for complete search history.

(56) References Cited

U.S. PATENT DOCUMENTS

| | | | | |
|---|---|---|---|---|
| 3,315,941 A | * | 4/1967 | Davies | 415/178 |
| 5,269,058 A | * | 12/1993 | Wiggs et al. | 29/889.72 |
| 5,429,877 A | * | 7/1995 | Eylon | 29/889.71 |
| 5,692,881 A | * | 12/1997 | Leibfried | 416/233 |
| 5,797,239 A | * | 8/1998 | Zaccone et al. | 52/793.1 |
| 5,826,332 A | * | 10/1998 | Bichon et al. | 29/889.72 |
| 6,048,174 A | * | 4/2000 | Samit et al. | 416/233 |
| 6,418,619 B1 | * | 7/2002 | Launders | 29/889.7 |
| 2004/0018091 A1 | | 1/2004 | Rongong et al. | |

FOREIGN PATENT DOCUMENTS

| | | |
|---|---|---|
| GB | 2 306 353 | 5/1997 |
| GB | 2 371 095 A | 7/2002 |
| GB | 2 391 270 A | 2/2004 |

OTHER PUBLICATIONS

Mar. 30, 2009 Search Report issued in British Patent Application No. 0903613.8.

* cited by examiner

*Primary Examiner* — Igor Kershteyn
(74) *Attorney, Agent, or Firm* — Oliff & Berridge, PLC

(57) ABSTRACT

A method of manufacturing an aerofoil structure capable of being diffusion bonded and superplastically formed to create a substantially hollow cavity within the aerofoil structure, the method comprising: providing two metallic panels; assembling and joining the two metallic panels to one another to form the aerofoil structure; wherein the two metallic panels each comprise a surface capable of forming an aerofoil and further comprise a root or section thereof which is either integral with or fixed to the aerofoil surface; and incorporating a section of a different material into a part, the said section being made from a material which is different from the material of another part of the aerofoil structure.

16 Claims, 2 Drawing Sheets

METHOD OF MANUFACTURING AN AEROFOIL

FIELD OF THE INVENTION

This invention relates to an aerofoil structure and method of manufacturing an aerofoil structure, and particularly but not exclusively relates to a substantially hollow aerofoil structure which is superplastically formed.

BACKGROUND OF THE INVENTION

It is known to manufacture hollow metallic aerofoils for example to be used as blades in a jet engine, and in particular fan blades for a turbomachine, by superplastic forming and diffusion bonding metallic panels, the panels forming pressure and suction surfaces of the blade. These blades are generally referred to as wide-chord fan blades. The metallic panels may include elementary metal, metal alloys and metal matrix composites. At least one of the metallic panels must be capable of superplastic extensions. In one known process the surfaces of the panels to be joined are cleaned, and at least one surface of one or more of the panels is coated in preselected areas with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is evacuated, using the pipe, and the pipe is sealed. The sealed assembly is placed in a pressure vessel and is heated and pressed to diffusion bond the panels together to form an integral structure. Diffusion bonding occurs when two mating surfaces are pressed together under temperature, time and pressure conditions that allow atomic interchange across the interface. The first pipe is removed and a second pipe is fitted to the diffusion bonded assembly at the position where the first pipe was located. The integral structure is located between appropriately shaped dies and is placed within a rig. The integral structure and dies are heated and pressurised fluid is supplied through the second pipe into the interior of the integral structure to cause at least one of the panels to be superplastically formed to produce an article matching the shape of the dies.

In addition to the hollow structure just described, it is also known to insert a membrane 2 between the metallic panels 4, 6 prior to the above described process (see FIG. 1 for example). The location of diffusion bonds between the membrane and the adjacent panels can be controlled by applying the stop-off material to preselected areas on each side of the membrane (or respective panels). When the aerofoil is subsequently expanded, at points where the membrane is attached to the outer panels this produces the internal structure.

FIG. 1 illustrates a known method of manufacturing an aerofoil structure. In this method a metallic sheet 2, made from, for example, titanium, is provided for forming the aerofoil structure. The sheet 2 is forged so as to produce two sections 4 of the sheet which are thicker than the main body of the sheet 2. This may be achieved by upset forging, wherein the length of the sheet is reduced in order to obtain the desired increase in cross-section or by drawing the sheet so as to increase the length and reduce the thickness of the main body of the sheet. The sheet 2 may be machine finished prior to the forging and/or splitting/dividing process.

As illustrated in FIG. 1(c) the forged sheet 2 is divided along an inclined plane 6 extending in a span-wise direction, so as to produce two substantially identical panels 8 and 10. The panels 8 and 10 need not be identical and alternative configurations may be used in order to provide desired properties for the resulting aerofoil e.g. the panels may be of differing thickness. The sheet 2 may be divided into the two panels 8 and 10 by way of any known technique which may be suitable for cutting the required width of the aerofoil, for example by using a band saw. To facilitate the cutting process, channels may be machined inboard of the elements 4 to allow the band saw to enter the workpiece, as described in patent application GB2306353 (see FIG. 2). The resulting panels 8 and 10 taper from the section 4 to the tip end of the panel.

The two panels 8 and 10 are then assembled so that their uncut exterior surfaces (which have been machine finished) are facing each other. Optionally, a membrane 12 may be positioned between the panels 8 and 10. As previously described, the assembly may then be diffusion bonded and superplastically formed in order to produce the desired external shape of the aerofoil. When joined, the sections 4 combine to form the root of the aerofoil which serves in use to attach the aerofoil, for example, to the hub of the rotor.

This method of manufacturing an aerofoil structure has certain disadvantages attributable to the forging process which is necessary in order to obtain the sections 4 that form the root of the aerofoil once the two panels 8 and 10 are assembled. In particular the thickness of the root is limited by the forging process such that it is often not possible to produce a root with the required thickness for the application. Furthermore, since the root and aerofoil structures experience different working loads and environments, it is desirable for these structures to have different material properties. This is not possible in the prior art method.

In accordance with a first aspect of the present invention there is provided a method of manufacturing an aerofoil structure capable of being diffusion bonded and superplastically formed to create a substantially hollow cavity within the aerofoil structure, the method comprising: providing two metallic panels; assembling and joining the two metallic panels to one another to form the aerofoil structure; wherein the two metallic panels each comprise a surface capable of forming an aerofoil and further comprise a root or section thereof which is either integral with or fixed to the aerofoil surface; and incorporating a section of a different material into a part of the aerofoil structure the said section being made from a material which is different from the material of another part of the aerofoil structure.

The section of a different material may be provided as a layer on the metallic panels. The method of manufacturing an aerofoil structure may further comprise selecting the different material to provide desirable properties for the section.

The section of a different material may be incorporated into one of the metallic panels or aerofoil surfaces, one of the metallic panels or aerofoil surfaces being manufactured from a lower quality material and the other one of the metallic panels or aerofoil surfaces being manufactured from a higher quality material.

A lower quality metallic panel or aerofoil surface may be manufactured from two pieces of the lower quality material and the higher quality metallic panel or aerofoil surface may be manufactured from a single piece of higher quality material.

The section of a different material may be incorporated into the leading and/or trailing edge of the aerofoil surface in order to increase service life.

The section of a different material may be incorporated into the tip of the aerofoil in order to increase strength of the tip to withstand contact with a casing abradable.

One of the aerofoil surfaces may be a pressure surface and the other aerofoil surface may be a suction surface, the suction surface being manufactured from a recycled material.

The section of a different material may be incorporated into a flank of the root in order to impart resistance to fretting of the root.

The section of a different material may be incorporated into the root so that the strength of the root material is greater than that of the aerofoil surfaces.

The root may be joined to the aerofoil at a position below an annulus line.

In accordance with a second aspect of the present invention there is provided a substantially hollow aerofoil structure comprising two metallic panels, each metallic panel comprising a surface capable of forming an aerofoil and further comprising a root or section thereof which is either integral with or fixed to the aerofoil surface; the aerofoil structure further comprising a section of a different material incorporated into a part of the aerofoil structure, the said section being made from a material which is different from the material of another part of the aerofoil structure.

The section of a different material may be provided as a layer.

The section of a different material may be incorporated into one of the metallic panels or aerofoil surfaces, one of the metallic panels or aerofoil surfaces being manufactured from a lower quality material and the other one of the metallic panels or aerofoil surfaces being manufactured from a higher quality material.

The lower quality metallic panel or aerofoil surface may be manufactured from two pieces of the lower quality material and the higher quality metallic panel or aerofoil surface may be manufactured from a single piece of higher quality material.

The section of a different material may be incorporated into the leading and/or trailing edge of the aerofoil surface.

The section of a different material may be incorporated into the tip of the aerofoil.

One of the aerofoil surfaces may be a pressure surface and the other aerofoil surface is a suction surface, the suction surface being manufactured from a recycled material.

The section of a different material may be incorporated into a flank of the root.

The section of a different material may be incorporated into the root.

The root may be joined to the aerofoil at a position below an annulus line.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE EMBODIMENTS

Figure 1:
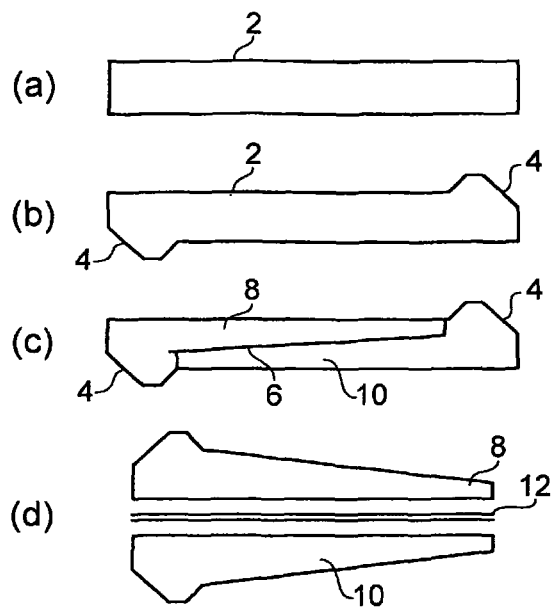
FIG. 1 shows a plan view of a known method of manufacturing an aerofoil.

In a first embodiment of the invention, the method of FIG. 1 may be improved by using a different material for one of the panels 8 or 10 from that of the other panel. For example a lower quality or lower specification material may be used for one of panels 8 or 10 and a higher quality or higher specification material for that of the other panel. The lower quality material may be a low-grade alloy and the higher quality material may be a high-grade alloy. The lower quality panel may comprise two layers of the low-grade alloy and the higher quality panel may comprise a single piece of the high-grade alloy.

Figure 2:
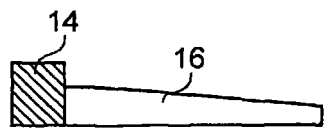
FIG. 2 shows a plan view of a first embodiment of the invention.

FIG. 2 illustrates a method of manufacturing an aerofoil structure in accordance with a second embodiment of the invention. Contrary to the known method described in relation to FIG. 1, the metallic sheet in this embodiment does not comprise an integral root. Instead the root may be provided by joining a mounting element 14 to an end of a divided panel 16 which is capable of forming an aerofoil surface. The mounting elements 14 may be joined to the sheet 20 by any suitable joining technique, in particular one or more of: diffusion bonding, friction stir welding, linear friction welding, electron beam welding or press bonding may be used. When two panels are assembled to form the aerofoil structure the respective mounting elements 14 of each panel are joined to form the root of the aerofoil. Alternatively the mounting elements 14 may be joined to the metallic plate prior to dividing so that when the plate is divided the mounting elements are joined to the panels, or in a further alternative the panels may be joined to one another prior to the joining of the root. The element 14 is of greater thickness than the panel 16 and the edge of the element 14 is aligned substantially parallel with the inward facing side of the panel 16. The substantially parallel surface created by the aligned edge of the element 14 and the panel 16 may be machine finished to ensure a uniform surface suitable for joining to an opposing panel.

The mounting element 14 which forms the root may be made from a material which is different from that of the panel 16. Conventionally in the production of an aerofoil, in particular for a fan blade of a turbomachine, there is an inevitable compromise between selecting a material which provides the strength required by the root but also which has the necessary properties for the aerofoil itself, in particular the ductility required to withstand bird strikes. In the present invention, the elements 14 may advantageously be made from a material with different properties to that of the aerofoil itself. Thus the material may be selected specifically for the requirements of the root, for example the root may be made from a material with greater strength than the panel 16. By strengthening the root or locating the point where the root is joined to the aerofoil at a position with lower consequences, for example below the annulus line, it is possible to design the aerofoil so as to fail at a position whereby the blade-off energy is reduced. The freedom of material choice for the root in turn gives increased flexibility in the choice of material used for the aerofoil as it is no longer necessary to compromise for the requirements of both the root and aerofoil. Therefore materials can be chosen with the required ductility, crack propagation resistance, and other characteristics desired. Any combination of materials for the root and aerofoil may be used which can be joined properly and may include dissimilar elementary metals, metal alloys (for example, different grades of Titanium) and metal matrix composites. The invention also facilitates low cavity or through cavity designs in which there is no membrane to form an internal structure. The percentage hollowness of such a blade is therefore increased which in turn reduces the weight and blade-off energy of the blade.

The first embodiment may be used in the configuration of the second embodiment wherein a separate root is provided. At least one of the aerofoil surfaces of the panels may be made from a material which is different from either or both of the other aerofoil surface or the root.

In accordance with a further embodiment of the invention, the mounting elements 4 or 14 may incorporate a section or layer of a material joined to the flank of the root which is formed by the mounting elements. The material may be different from that of the root itself. The different material may be chosen to reduce fretting of the flank of the root which may be caused by vibration of the root within the mount (for example the hub of the fan). The material may be joined or provided as a layer on top of the root material in some or all of the areas in which the root may experience fretting.

Figure 3:
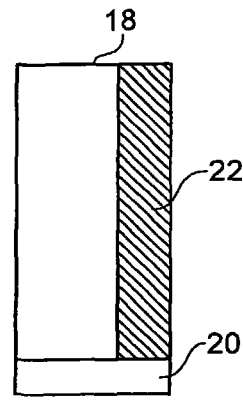
FIG. 3 shows a side view of a further embodiment of the invention.

FIG. 3 illustrates a further embodiment of the invention, in which a section of material is provided on the leading and/or trailing edges 22 of the panel 18. The panel may be in accordance with any of the embodiments of the invention and thus the root 20 may be integral or joined to the aerofoil. The section of material 22 may be provided to some or all of the leading and/or trailing edges on either or both of the pressure and suction surfaces of the aerofoil. This may include the root of the aerofoil and this may advantageously simplify the manufacturing process. The section of material 22 may be joined to the panel 18 or may be applied as a layer on top of the trailing and/or leading edges of the panel 18. The section of material may be made from a different material from that of the panel 18 and/or the root 20. The material may be selected to increase the service life of the leading and/or trailing edges. As an alternative, or in addition to the above embodiment, the section of material may be provided at a tip of the aerofoil (not shown) at the opposing end of the aerofoil to the root. The section of material may extend towards the root of the aerofoil and comprise a substantial part of the aerofoil surface if desired. The section of material may again be joined to the panel 18 or may be applied as a layer on top of the tip of the panel 18. The section of material may be made from a different material from that of the panel 18. In the application of using the aerofoil as a fan blade or other blade for a turbomachine, the casing housing of the blade may comprise an abradable material which allows the blade to develop a path through it. This configuration allows the housing to adapt to deviations in the path of the blade whilst maintaining a close tolerance between the tip of the blade and the casing. The section of material may therefore be manufactured from a material which is capable of withstanding contact with the casing abradable. Alternatively the tip of the blade may comprise a section of material which is itself abradable and thus forms to the casing.

Figure 4:
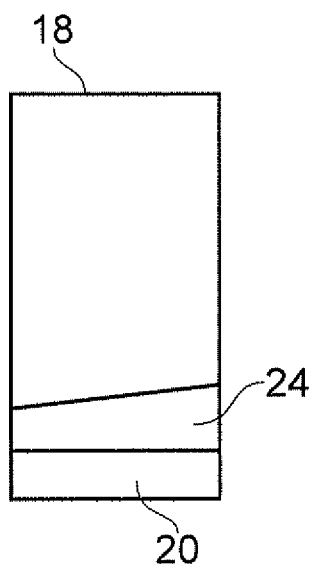
FIG. 4 shows a side view of a further embodiment of the invention.

FIG. 4 illustrates a further embodiment of the invention in which a different material 24 is welded or joined across the aerofoil surface 18. The sections of a different material may be provided to increase the strength of the aerofoil surface or to create residual compressive strain within the aerofoil structure.

Furthermore sections of the aerofoil structure may be replaced by sections of a different material, wherein the different material is incorporated in areas of low stress and is cheaper, of lower grade, quality and/or specification and/or is a recycled material. Thus invention therefore may reduce the cost of manufacturing the aerofoil structure. Alternatively, areas of the aerofoil which during service experience high stress or which have high service requirements may be made from a higher specification material. This avoids requiring the whole aerofoil to be made from the higher specification material and ensures that the higher stress or higher service requirement sections do not wear prior to the rest of the aerofoil, such that the whole aerofoil has to be replaced.

In the foregoing embodiments it may be necessary to alter the super plastic forming and/or diffusion bonding processes. For example where the panels are of differing thickness and/or material it will be necessary to adjust the manufacturing process to ensure that inflation is even and that one panel does not inflate before the other. Therefore alterations to the process parameters and algorithms of the gas-pressure cycle may need to be made.

In the foregoing embodiments of the present invention the section of a different material may be incorporated into the aerofoil structure by any suitable method such as joining by one or more of: diffusion bonding, friction stir welding, linear friction welding, electron beam welding, or press bonding; or applying a layer of the material by one or more of: thermal spraying, cold spraying, direct metal deposition.

Although the invention has been described in reference to an aerofoil for use as a fan blade it may also be employed in an output guide vane, or a wing or other aerofoil structure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A method of manufacturing an aerofoil structure capable of being diffusion bonded and superplastically formed to create a substantially hollow cavity within the aerofoil structure, the method comprising:
   providing two metallic panels, one metallic panel is of a different material from the other metallic panel, each metallic panel includes; a surface capable of forming an aerofoil, and a root or section of the root that is either unitary with or fixed to the aerofoil surface; and
   assembling and joining the two metallic panels to one another to form the aerofoil structure.

2. A method of manufacturing an aerofoil structure as claimed in claim 1, further comprising selecting the different material to provide desirable properties for the section.

3. A method of manufacturing an aerofoil structure as claimed in claim 1, wherein the root is joined to the aerofoil at a position below an annulus line.

4. A substantially hollow aerofoil structure, comprising:
   two metallic panels, one metallic panel is of a different material from the other metallic panel, each metallic panel including a surface capable of forming an aerofoil, a root or section of the root that is either unitary with or fixed to the aerofoil surface.

5. A substantially hollow aerofoil structure as claimed in claim 4, wherein the section of a different material is incorporated into one of the metallic panels or aerofoil surfaces, one of the metallic panels or aerofoil surfaces being manufactured from a lower quality material and the other one of the metallic panels or aerofoil surfaces being manufactured from a higher quality material.

6. A turboengine comprising an aerofoil structure as claimed in claim 4.

7. A method of manufacturing an aerofoil structure capable of being diffusion bonded and superplastically formed to create a substantially hollow cavity within the aerofoil structure, the method comprising:

providing two metallic panels that each include a surface capable of forming an aerofoil and a root or section of the root that is either unitary with or fixed to the aerofoil surface;

assembling and joining the two metallic panels to one another to form the aerofoil structure; and incorporating a section of a different material into a part of one metallic panel, the section being made from a different material from the rest of the metallic panel.

8. A method of manufacturing an aerofoil structure as claimed in claim 7, wherein the section of a different material is provided as a layer.

9. A method of manufacturing an aerofoil structure as claimed in claim 7, wherein the section of a different material is incorporated into one of the metallic panels or aerofoil surfaces, one of the metallic panels or aerofoil surfaces being manufactured from a lower quality material and the other one of the metallic panels or aerofoil surfaces being manufactured from a higher quality material.

10. A method of manufacturing an aerofoil structure as claimed in claim 7, wherein the lower quality metallic panel or aerofoil surface is manufactured from two pieces of the lower quality material and the higher quality metallic panel or aerofoil surface is manufactured from a single piece of higher quality material.

11. A method of manufacturing an aerofoil structure as claimed in claim 7, wherein the section of a different material is incorporated into the leading and/or trailing edge of the aerofoil surface.

12. A substantially hollow aerofoil structure, comprising:

two metallic panels, each metallic panel including a surface capable of forming an aerofoil, and a root or section of the root that is either unitary with or fixed to the aerofoil surface; and a section of a different material incorporated into a part of one of the metallic panels, the section being made from a different material than a reminder of the one metallic panel.

13. A substantially hollow aerofoil structure as claimed in claim 12, wherein the section of a different material is provided as a layer.

14. A substantially hollow aerofoil structure as claimed in claim 12, wherein the lower quality metallic panel or aerofoil surface is manufactured from two pieces of the lower quality material and the higher quality metallic panel or aerofoil surface is manufactured from a single piece of higher quality material.

15. A substantially hollow aerofoil structure as claimed in claim 12, wherein the section of a different material is incorporated into the leading and/or trailing edge of the aerofoil surface.

16. A substantially hollow aerofoil structure as claimed in claim 12, wherein the root is joined to the aerofoil at a position below an annulus line.

* * * * *